Feb. 16, 1943.  C. A. SCOTT  2,311,579
SOLAR HEATER
Filed April 17, 1940  2 Sheets-Sheet 1
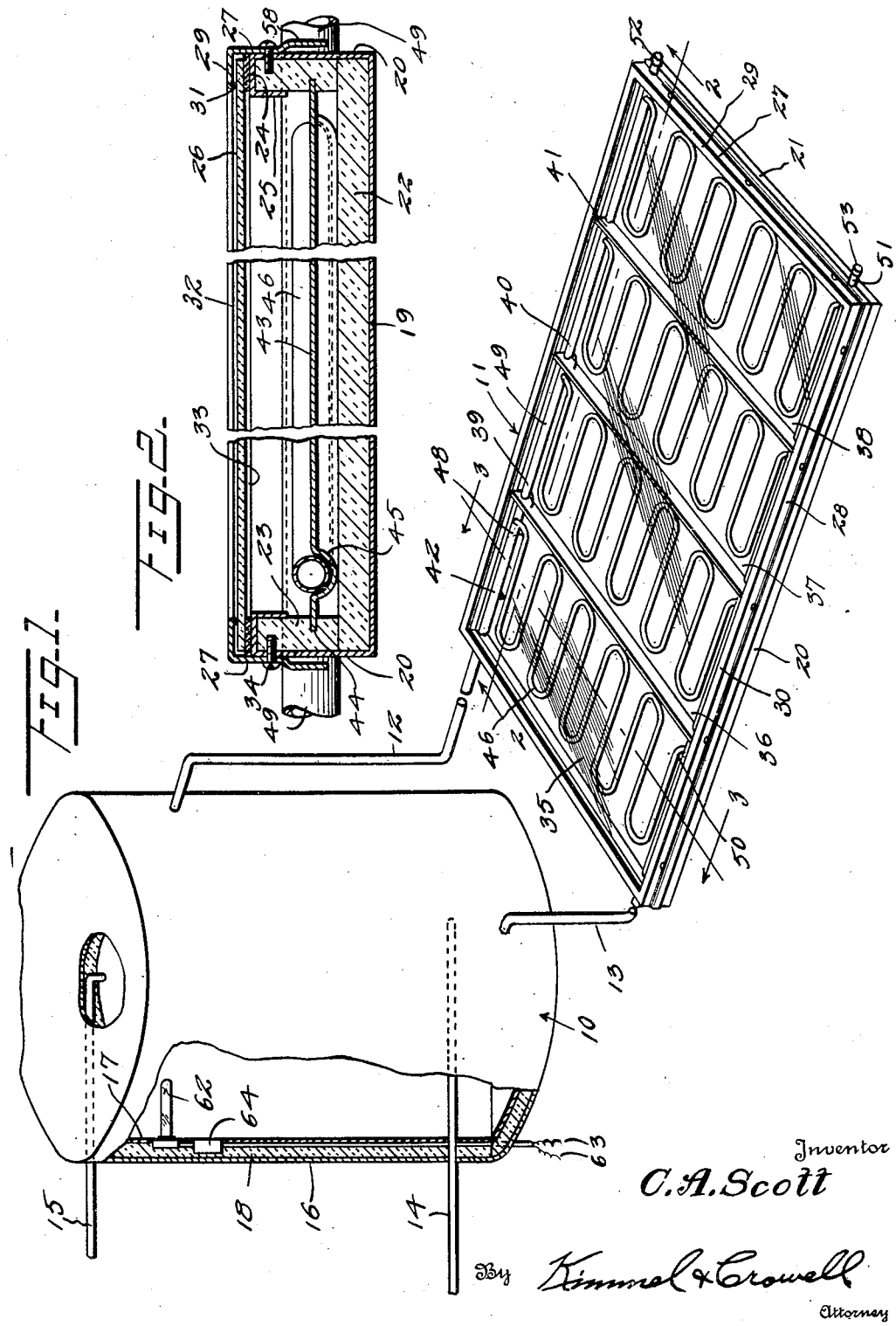
Inventor
C. A. Scott
By Kimmel & Crowell
Attorney

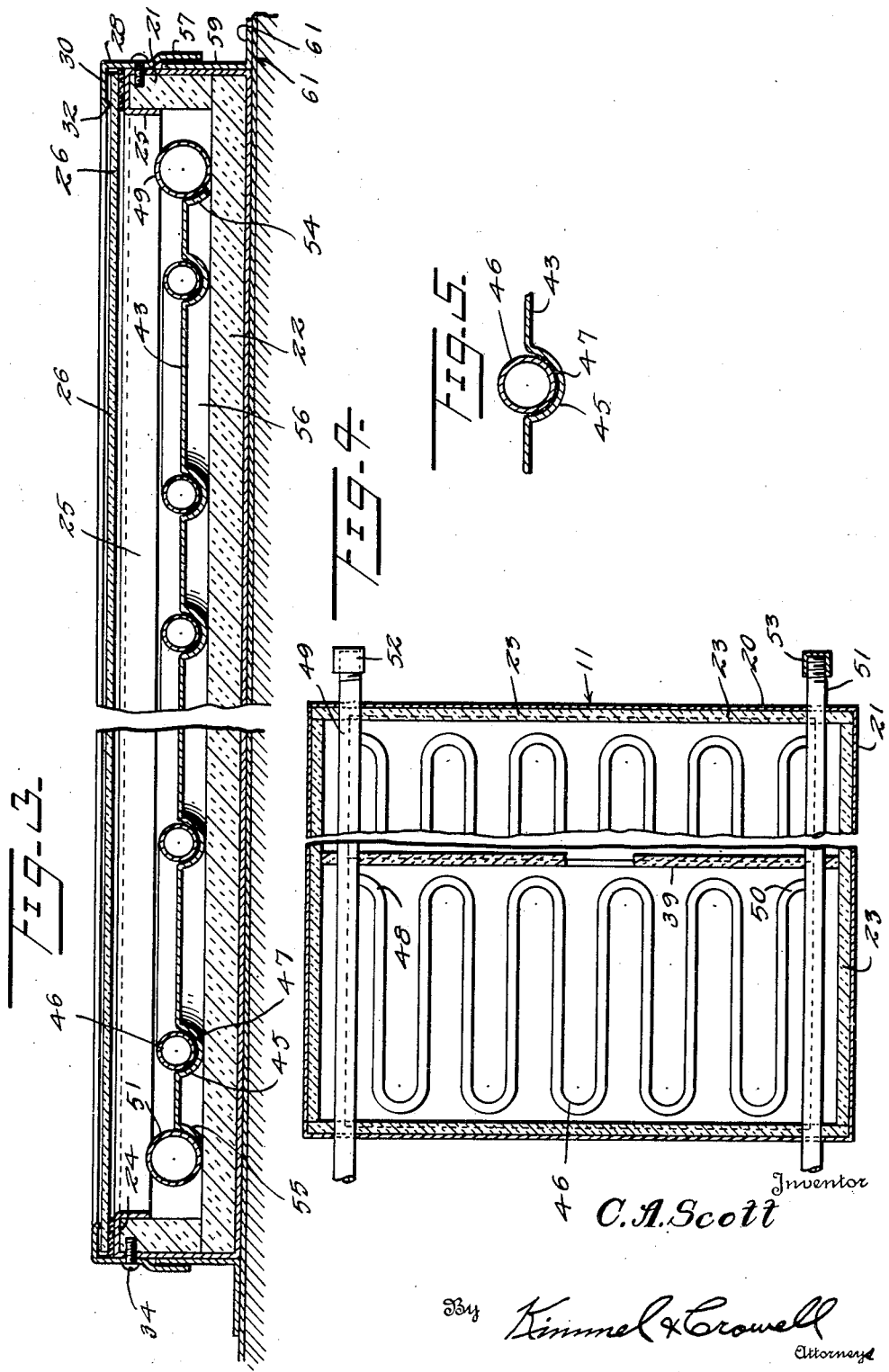

Patented Feb. 16, 1943

2,311,579

UNITED STATES PATENT OFFICE 2,311,579

SOLAR HEATER

Clifton A. Scott, North Miami Beach, Fla., assignor, by direct and mesne assignments, to Sun-Ray Heater Company, North Miami Beach, Fla., a copartnership.

Application April 17, 1940, Serial No. 330,215

2 Claims. (Cl. 126—271)

This invention relates to hot water heaters and more particularly to an improved solar heater.

An object of this invention is to provide an improved solar heater which is so constructed as to be capable of absorbing the sun's rays more efficiently than heaters at present available.

A further object of this invention is to provide a heater of this character which is so constructed that a dead air space will be formed between the coil supporting plate or sheet and the housing so as to insulate the coil from the housing which in itself is made of heat insulating material.

A still further object of this invention is to provide in combination an improved backing or supporting sheet for the coil which is so constructed as to avoid the formation of shadows which have a tendency to reduce the heating efficiency of the device.

The invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a perspective view of a heating system having a solar heater constructed according to an embodiment of this invention, the reservoir or collector being partly broken away and in section.

Figure 2 is a sectional view taken on the line 2—2 of Figure 1.

Figure 3 is a sectional view partly broken away taken on the line 3—3 of Figure 1.

Figure 4 is a plan view partly broken away and in section of the heater.

Figure 5 is a transverse sectional view of one of the heating coils.

Referring to the drawings, the numeral 10 designates generally a hot water reservoir and the numeral 11 designates generally a solar heater constructed according to this invention which is connected to the reservoir 10 by means of a cold water pipe 13 and a hot water pipe 12. The pipe 12 discharges into the tank or reservoir 10 at a point adjacent the upper portion thereof and the cold water pipe 13 is connected to the reservoir or tank 10 closely adjacent the bottom thereof. A cold water supply pipe 14 discharges into the lower portion of the reservoir 10, being connected to a suitable source of water supply, and a hot water outlet pipe 15 is connected at one end to the upper portion of the reservoir or tank 10 and is adapted to be connected to spigots or the like which are positioned within a building.

The reservoir 10 comprises an outer shell or casing 16, an inner casing 17 and an insulated wall 18 disposed between the outer and inner casings 16 and 17, respectively.

The solar heater 11 comprises a metallic housing including a bottom wall 19, side walls 20 and end walls 21. An insulated sheet 22 is mounted within the metallic casing formed by the bottom wall 19, side walls 20 and the end walls 21, and the sheet 22 is constructed of material which is heat insulating. Upwardly extending heat insulating members 23 are disposed inwardly of the side and end walls 20 and 21 and engage the upper surface of the bottom insulating member 22. The side and end walls 20 and 21 at their upper ends are each provided with an inwardly extending angle-shaped flange formed of a horizontal leg 24 and a vertical leg 25 depending from the inner end of the leg 24. The legs 24 seat on the tops of members 23. The legs 25 extend downwardly along the inner faces of the insulating members 23 so as to firmly hold the side and end members 23 in the metal housing or outer shell. When the members 23 are secured in the manner aforesaid they act to hold the sheet 22 down. A transparent plate 26 of glass or the like is adapted to close the upper open end of the heater housing and is secured to the upper ends of the side and end members 20 and 21, respectively, by means of a rectangular frame including a pair of vertical end walls 27. Integral with the upper ends of the walls 27 are the oppositely disposed inwardly extending flanges 29 which engage over the longitudinal edges of the transparent plate 26. Integral with the upper ends of the walls 28 are the oppositely extending flanges 30 which engage over the horizontal edges of the transparent plate 26. Preferably the width of the flanges 29, 30 in transverse cross section will correspond to the width of the upper edges of the members 23. Each flange 29 has its inner edge formed with a depending bead 31 for contact with the upper face of the plate 26. Each flange 30 has its edge formed with a depending bead 32 for contact with the upper face of the plate 26. The beaded flanges 29, 30 provide for resiliently clamping the plate 26 on the upper end of the metallic housing. A cushioning member 33 is interposed between the plate 26 and the upper faces of the side and end walls 20 and 21, respectively, and provides a means in association with the clamping frame comprising the side members 28 and end members 27 and the flanges 29 and 30 for holding the transparent plate 26 on the heater housing tightly and at the same time permitting expansion and contraction of this plate 26 and the air within the housing.

The clamping frame for the transparent plate 26 is removably secured to the lower housing by fastening devices 34 which extend through the side walls 28 and end walls 27 of the clamping frame and through the side and end walls 20 and 21, respectively.

The housing 11 is divided into a plurality of heater compartments or chambers 35, 36, 37 and 38 by means of transversely extending partitions 39, 40 and 41. The partitions at their lower and upper edges engage respectively the upper surface of member 22 and the under surface of the transparent plate 26. The opposite ends of the partitions are secured to the side walls 20 in any suitable manner.

A water heating member generally designated as 42 is disposed in each heating chamber and the heating member 42 comprises a plate 43 which is disposed in upwardly spaced relation to the inner member 22, as shown in Figure 2. The heat conducting members 43 within the outer compartments extend into the end members 23 and into the partitions 39. The end members 23 are formed with recesses 44 for receiving the heat conducting members arranged in the outer compartments. The heat conducting members 43 in the inner compartments extend into the partitions 39. Each heat conducting member 43 is formed with a continuous depressed portion which forms an upwardly opening groove 45 of serpentine contour. The lower face of grooves 45 of said members 43 seat on the upper face of member 22. The members 43 are spaced from the side members 23.

Arranged in the groove 45 of each member 43 is a hot water coil 46 corresponding in contour to that of the groove. The coil 46 is formed of a continuous length of copper or other suitable metal pipe and the pipe 46 is fixedly secured in the groove 45 by means of solder 47 or the like. Preferably the groove 45 is substantially semi-cylindrical in transverse section so that substantially one half of the coil 46 will extend above the upper surface of the support plate 43.

In the construction of the heating member, the plate 43 is initially formed with the desired groove or channel 45 and then a strip of solder 47 is laid in the bottom of the groove 45 as shown in Figures 4 and 5. The solder 47 may be arcuate in transverse section so that it will lie snugly of the groove 45. The coil 46 is placed on top of the solder 47. The plate 43 with the coil 46 engaging the interposed solder 47 is then placed in a heating oven where the structure is subjected to sufficient heat to melt the solder 47 and thus secure the coil 46 to the plate 43. One end 48 of the coil 46 is connected to a longitudinally extending hot water manifold pipe 49 which extends lengthwise of a side wall member 23 and the other end 50 of the coil 46 is connected to a cold water manifold pipe 51 which extends lengthwise of the casing 11 on the opposite side from the hot water pipe 49. One end of the hot water pipe 49 is adapted to be connected to the pipe 12 and the other end 49 may be closed by a cap 52. One end of the cold water pipe 51 is connected to the cold water pipe 13 and the other end of the cold water pipe 51 may be closed by a cap 53.

The upper surface of the coil supporting plate 43 and the exposed surface of the coil 46 is coated with a black coat of paint or other suitable heat absorbing material whereby when the sun's rays strike the plate 43 and the coil 46, the coating will assist in absorbing the heat. As shown in Figure 3, the opposite longitudinal edges of the coil supporting plate 43 are each provided with downwardly curved extensions 54 and 55 which engage the outer surfaces of the pipes 49 and 51, respectively, at a point below the center thereof and form a means not only for attaching the plate 43 to the manifold pipes 49 and 51, but also for supporting the plate 43 in upwardly spaced relation to the inner bottom 22, and coact with the grooved portions 45 in forming a dead air space 56 between the underside of the heat absorbing plate 43 and the upper surface of the inner bottom 22. As shown in Figure 3 the hot and cold water manifold pipes 49 and 51 are of a substantially larger diameter than the diameter of the coil 46 so that a single hot water collecting pipe may be connected to a number of hot water coils forming a heater unit and a single water pipe may be connected in a similar manner to a number of heater coils.

In order to provide a means whereby the housing 11 may be suitably secured to a roof or the like, the clamping frame for the transparent plate 26 is provided with an outwardly offset part 57 formed with the side walls 28 and also with an outwardly offset depending part 58 formed with the end members 27. One leg 59 of an angle-shaped flashing is adapted to engage between the offset portions 57 and 58 as shown in Figure 3 and the other leg 60 is adapted to engage the upper surface of a roof generally designated as 61. In this manner the heating unit may be mounted on a roof in a position where the rays of the sun will contact with the heater coil 46 through the transparent plate 26 and water such as rain or the like cannot seep between the under surface of the heater unit and the roof 61.

The heating unit hereinbefore described will provide a considerable amount of hot water which is discharged into the reservoir or collector 10 and where the rays of the sun do not contact with the heating unit for a sufficient length of time to provide the desired hot water in the reservoir 10, I have provided an electric heating element 62 which is extended into the interior of the reservoir 10 and is connected by suitable wires 63 to a source of electric current supply. The heating unit 62 is of conventional construction and is suitably enclosed in a waterproof housing, the details of which are well known.

A thermostat 64 of conventional construction is interposed in the conductors 63 and is projected at least partly through the inner wall 17 of the reservoir 10 so that the heating element 62 may be energized when the water in the reservoir 10 drops below a predetermined temperature.

The operation of the solar heater hereinbefore described is well known, the heater unit 11 being mounted on the exterior of a building in a position to receive the rays of the sun. The reservoir or hot water tank 10 is preferably mounted on the interior of the building and the hot water pipe 15 extended to the desired portions of the building where the hot water may be drawn from the tank 10. The coil 46 together with the pipes 49 and 51 are constructed of metal such as copper or the like which is heat conducting and preferably non-corrosive. It will be understood that the supply pipe 14 provides sufficient pressure in the tank 10 and in the heating coil 46 so that when the water in the coil 46 is heated, the water will circulate from the lower portion of the tank 10 to the upper portion of the latter. It is only necessary that the rays of the sun contact with the heating unit for a relatively short period in order to heat the water in the tank 10.

By providing the tank 10 with insulation, the hot water in the tank will remain hot for several days and in this manner, the heating unit will provide sufficient hot water for the dwelling or building to which it is secured.

By constructing a heating unit in accordance with this invention, the hot water coil and the backing or supporting sheet therefor can be secured together in a single operation thus eliminating the present practice of manually soldering the coil to the backing or supporting sheet. In addition, by forming the backing sheet with the groove 45 within which the coil seats, the backing sheet will only contact at a single point with the inner bottom 22 and a dead air space 56 will be formed between the under surface of the backing sheet and the inner insulating bottom thus eliminating the transfer or exchange of heat between the coil 46 and the inner bottom 22. In practice the upper surface of the backing sheet 43 is painted black and the exposed surface of the coil 46 is also painted black together with the inner faces of the side and end members 23 and the inner faces of the flanges 25.

By constructing a solar heater in accordance with this invention, the cost of the heater may be reduced very considerably as heretofore the assembling of the heater has been the greatest factor in the cost so that when a heater is constructed, the assembly is a relatively simple and quick operation due to the fact that the backing plate 43 may be formed with the groove 45 by stamping this groove in the plate 43 whereupon the solder may be laid in the groove and the coil 46 placed on top of the solder.

The entire structure may then be placed in a soldering oven where the coil and backing sheet is heated to a point sufficient to melt the solder and thus secure the coil tightly to the backing sheet 43 within the groove 45. The formation of the groove 45 to a depth substantially one-half the diameter of the coil 46 avoids the formation of shadows which at present reduce the efficiency of the heater coils in units not constructed according to this invention.

By forming the dead air space 56 between the sheet 43 and the member 22, the latter will not retard the initial heating of the water in the coil 46, as the dead air space will serve as an insulating space and the only transfer of cold from the member 22 will be at the point of contact with the sheet 43 at the depending portion of the latter.

What I claim is:

1. In a solar heater comprising an open top metallic housing having bottom, side, and end walls, a lower heat insulation member disposed over the upper face of said bottom and bearing against the inner faces of said walls, upstanding heat insulating strips, seated on said lower member and bearing against the inner faces of said walls, the upper parts of said walls being bent to retain the said strips against the walls and the strips in contact with said member, partitions coacting with said member and strips to form open top parallel compartments, a cold water manifold extending through said end walls, compartments, and partitions and disposed in proximity to one of the side walls, a hot water manifold extending through said end walls, said compartments and partitions and disposed in proximity to the other side wall, said manifolds positioned on said member, a sheet like heat conducting element in each compartment below the top thereof and provided respectively with a continuous depending portion forming a groove and with a depending part at each end, said elements engaging said strips and partitions, the said portions and parts of said elements being in contact with said member to thereby space the major portion of said elements from said member to form dead air spaces, means for connecting the depending parts of said elements to the inner sides of said manifolds, tubes secured in and extending above the groove of said elements, each tube connected at one end to an opening into the cold water manifold and at its other end connected to an opening into the hot water manifold, and a closure for said housing including a transparent member disposed over said compartments.

2. A solar heater comprising an open top metallic housing having bottom, side, and end walls, heat insulating means within and disposed against the bottom and walls of the housing, partitions coacting with said means to form a plurality of parallel open top compartments, spaced parallel cold and hot water manifolds extending through said housing, partitions and compartments, a sheet like heat conducting element in each compartment below the top thereof, each said element having respectively a continuous depressed portion forming a groove of serpentine contour and a depending part at each end, said elements positioned between said partitions, the said portions and parts of said elements being seated on that part of said means employed for insulating the bottom of the housing to thereby space the major portion of said elements from said means to form dead air spaces, said depending parts of said elements being secured to the inner sides of said manifolds, tubes secured in and extending above the groove of each element, each tube being connected at one end to an opening into the cold water manifold and its other end connected to an opening into the hot water manifold and a closure structure for said housing including a transparent member disposed over all of said compartments.

CLIFTON A. SCOTT.